United States Patent [19]

Carboni et al.

[15] 3,681,450
[45] Aug. 1, 1972

[54] PREPARATION OF P-AMINOBENZOYL CHLORIDE SALTS
[72] Inventors: Rudolph A. Carboni, Centerville, Del.; Josef Pikl, Glassboro, N.J.
[73] Assignee: E. I. du Pont De Nemours and Company, Wilmington, Del.
[22] Filed: July 18, 1969
[21] Appl. No.: 843,233

[52] U.S. Cl. ............................................. 260/544 M
[51] Int. Cl. .............................................. C07c 51/58
[58] Field of Search ................................... 260/544 R

[56] References Cited
UNITED STATES PATENTS
2,763,678 9/1956 Gumme ..................... 260/471 R
3,168,557 2/1965 Pietrusza ..................... 260/518

*Primary Examiner*—Lorraine A. Weinberger
*Assistant Examiner*—Richard D. Kelly
*Attorney*—Francis J. Crowley

[57] ABSTRACT

Preparation of p-aminobenzoyl chloride salts by reacting a p-aminobenzoic acid salt with at least about 1.2 moles, per mole of said p-aminobenzoic acid salt, of thionyl chloride or phosphorus pentachloride in an inert solvent as herein defined at from about 20°–120° C., by either batch or continuous processes, the resulting product being a valuable monomer for preparation of thermally resistant p-benzamide polymers.

11 Claims, No Drawings

PREPARATION OF P-AMINOBENZOYL CHLORIDE SALTS

This invention relates to processes for the preparation of p-aminobenzoyl chloride salts, especially the hydrochloride salt, which are useful monomers for the preparation of high molecular weight p-benzamide polymers as described in U.S. Pat. No. 3,225,011. Polybenzamides have high temperature stability and are suitable for the production of fibers and films.

Several methods have been described for the preparation of the preferred p-aminobenzoyl chloride hydrochloride salt. One method is that of reacting finely pulverized p-aminobenzoic acid and PCl₅ in the presence of an inert diluent (German Pat. No. 500,436). The essential feature of this process is the micropulverization of the reactants in corrosion resistant equipment. The reaction is described as taking 20 hours in a ball mill. This becomes costly and impractical when scaled up to commercial plant production. More important is the fact that the p-aminobenzoyl chloride hydrochloride made by this process yields an unsatisfactory polymer of extremely low inherent viscosity.

A more widely investigated process consists of treating p-aminobenzoic acid with thionyl chloride. Since p-aminobenzoic acid possesses two groups reactive with thionyl chloride, this reaction produces p-thionylaminobenzoyl chloride, both the amino and carboxylic acid groups reacting. This intermediate is isolated and reacted with hydrogen chloride to form the desired p-aminobenzoyl chloride hydrochloride [Graf and Langer, J. f. prakt. Chem. 148 161–9 (1937)]. This method has not only the disadvantage of being in two stages, but more important, involves the formation of a reactive and heat sensitive intermediate, making separation and distillation difficult. Thus production of a high quality product in large quantities has not been previously feasible.

It is an object of this invention to provide a direct process for the preparation of p-aminobenzoyl chloride hydrochloride and other salts. It is a further object to provide a process which can be operated easily commercially by batch or continuous processes.

BRIEF SUMMARY OF THE INVENTION

This invention relates to the preparation of p-aminobenzoyl chloride salts (preferably the hydrochloride salt) batchwise or continuously by reacting a p-aminobenzoic acid salt with at least about 1.2 moles of a chlorinating agent selected from thionyl chloride and phosphorus pentachloride (preferably thionyl chloride) per mole of p-amonobenzoic acid salt in an inert organic solvent having a minimum solubility for the acid salt of at least 0.1% by weight at from about 20° C. to about 120° C., and recovering the product. In the batch process, temperatures of 20°–40° C. are preferably employed; while temperatures of about 50°–120° C. are generally used in the continuous process wherein streams of the chlorinating agent and of a slurry of the p-aminobenzoic acid salt and solvent are continuously fed through a reactor.

The preferred method of preparing the p-aminobenzoic acid salt reactant is to dissolve p-aminobenzoic acid in the solvent to be employed in the above reaction and adding thereto the corresponding anhydrous acid in an amount providing at least one molar equivalent/mole of p-aminobenzoic acid. In the batch process, the reaction with the chlorinating agent may then be carried out in situ; or this slurry may be used to provide the feed stream of p-aminobenzoic acid salt for the continuous process.

DETAILED DESCRIPTION OF THE INVENTION

A method has now been found whereby the preferred p-aminobenzoyl chloride hydrochloride can be obtained directly from a different starting material, the readily available p-aminobenzoic acid hydrochloride. It has been found surprisingly, that the p-aminobenzoic acid hydrochloride salt is easily converted to p-aminobenzoyl chloride hydrochloride with phosphorus pentachloride (PCl₅) or preferably thionyl chloride (SOCl₂), in the presence of an inert organic solvent having a minimum solubility for the acid salt of 0.1 percent by weight, in one stage without the formation of p-thionylaminobenzoyl chloride, as would be expected. The same method is also applicable to preparing other p-aminobenzoyl chloride salts, such as the sulfate, p-toluenesulfonate, hydrobromide, phosphate and phosphite salts, directly from the corresponding p-aminobenzoic acid salt.

It has been further found that the p-aminobenzoyl chloride salt is most advantageously prepared by formation in the same solvent of the reaction and treating in situ to obtain the desired product.

The reaction of the p-aminobenzoic acid salt with the chlorinating agent is most advantageously carried out in the inert solvent at a temperature in the range of about 20°–to 120° C. At 25°–30° C., the reaction is generally slow, taking 2 to 3 hours to complete, while at 60°–70° C. it takes only a few minutes. The 20°–40° C. temperature range is generally employed in the batch process, while the upper temperatures (50°–120° C.) are more advantageous in the continuous process where better mixing of reactants is obtainable.

The ratio of inert solvent to p-aminobenzoic acid salt (batch or continuous) can be varied over a wide range from about one to 10 parts by weight of solvent to one part of p-aminobenzoic acid salt, preferably 3–10 parts, depending largely on the solubility of the acid salt in the inert solvent. The solvent should have a minimum solubility for the acid salt of at least 0.1% by weight of the salt based on the solvent weight. Hydrocarbon solvents such as benzene are found to have too low a solubility for the acid salt to be useful.

The preferred inert organic solvents from the standpoint of faster reaction rates and/or higher yields are polar solvents such as tetramethylene sulfone, ethylene glycol dimethyl ether, tetraethylene glycol dimethyl ether, diethylene glycol dimethyl ether and hexamethyl phosphoramide.

It may be found desirable in some cases to add a diluent to the reaction mass to make the mixture easily stirrable. As a diluent, the chlorinating agent may be used in excess of the quantity necessary for the reaction. Also, another inert solvent or diluent which does not react with the chlorinating agent or acid salts and which is soluble or miscible with the solvent used for the reaction may be added. Examples of such diluents are methylene chloride, chloroform, benzene and carbon tetrachloride. Phosphorus oxychloride may optionally be added to the reaction mixture to aid formation of the acid salt.

The amount of chlorinating agent (preferably thionyl chloride) may be varied over a wide range. At least 1.2 moles per mole of p-aminobenzoic acid salt are required for completion of reaction in a reasonable time. Generally 3 to 20 moles of chlorinating agent may be used, preferably 3 to 7 moles.

The starting material, the p-aminobenzoic acid salt may be easily prepared from readily available p-amonobenzoic acid by precipitating the salt from an aqueous solution of the acid, filtering and drying, according to methods well known in the art. Or, more advantageously when operating as a batch process, the p-aminobenzoic acid salt may be formed in the reaction solvent by dissolving p-aminobenzoic acid in the solvent and adding the corresponding anhydrous acid. That is, the hydrochloride, sulfate, p-toluenesulfonate, hydrobromide, phosphate and phosphite salts are prepared from the corresponding anhydrous hydrogen chloride, sulfuric acid, p-toluenesulfonic acid, hydrogen bromide, phosphoric acid and phosphorus acid. The amount of anhydrous acid may vary from the stoichiometric amount of one molar equivalent, per mole p-aminobenzoic acid, to as much as 5 molar equivalents or more. When a large excess is used, the reaction rate with the chlorinating agent may be slightly reduced and it may require either a higher temperature or a longer time to complete the reaction. The temperature is generally about 30°–90° C., though lower temperatures can be employed with large amounts of solvent.

The process may be operated by batch or continuous methods. When operating continuously, the p-aminobenzoic acid salt is preformed and a slurry thereof in the reaction solvent is fed into the reactor simultaneously with a stream of the chlorinating agent. The temperatures for the continuous process are generally in the upper range of 50°–120° C., preferably 60°–65 C. The reactants are typically maintained at this temperature for about 2 to 10 minutes. The exit stream is led into a vessel generally cooled to about 0°–10 C., a diluent added, the product filtered, washed and dried. The rate of flow of the two streams will naturally depend on reactor design so as to provide the desired residence time in the reactor.

EXAMPLES

The following examples illustrate the process. All parts are by weight unless otherwise noted.

Example 1

27.4 Parts (0.158 mole) of p-aminobenzoic acid hydrochloride were added to a mixture of 230 pts. (0.517 mole) of thionyl chloride and 50 parts of tetramethylene sulfone. No significant amount of product dissolved in the mixture of reaction solvents. The slurry was then agitated at 25° C. for 40 hours. Intermittent determinations of the IR (infrared) spectrum of the solid indicated a slow formation of the p-aminobenzoyl chloride hydrochloride, which was completed after 40 hours. The reaction mixture was then diluted with methylene chloride, filtered in the absence of moisture, washed with dry methylene chloride and dried at room temperature in a stream of dry nitrogen. The yield of dry material was 27 pts. (0.141 mole), 89% of theory.

If in the above reaction of p-aminobenzoic acid hydrochloride with thionyl chloride, the tetramethylene sulfone is omitted, no reaction takes place up to 52 hours at room temperature.

If 60 parts of phosphorus oxychloride are added to the original solvent mixture of thionyl chloride, and tetramethylene sulfone, the reaction proceeds giving 92% of theory yield.

The tetramethylene sulfone may be diluted with other solvents when reacting p-aminobenzoic acid hydrochloride with thionyl chloride at room temperature, e.g. with methylene chloride, $POCl_3$, ethylene glycol dimethyl ether, etc.

Example 2

156 Parts (1.14 moles) of p-aminobenzoic acid were dissolved at 70° C. in 1,100 parts tetramethylene sulfone, then cooled to 50° C. and 50 parts (1.37 moles) hydrogen chloride introduced with agitation. After cooling to 25° C. there was added thionyl chloride, 950 parts (7.98 moles), and the reaction continued at 20°–25 C. for 4 hours. When the reaction was completed, there were added 2,200 parts of methylene chloride, [which was dehydrated by adding a small amount of thionyl chloride (0.1–2%)], and then cooled to 5° C. and filtered in the absence of moisture, washed with more anhydrous methylene chloride and dried in a stream of dry nitrogen at room temperature. The yield of dry product was 187 parts (0.974 mole), equal to 86% of theory.

When the above procedure was carried out as described above, but using 660 parts (5.55 moles) of thionyl chloride, a 94% of theory yield was obtained.

Example 3

250 Parts (1.82 moles) of p-aminobenzoic acid were dissolved in 1,760 parts of tetramethylene sulfone and 80 parts of anhydrous hydrogen chloride were introduced (2.2 mole). 435 Parts (3.66 moles) of thionyl chloride (2.0 moles/mole p-aminobenzoic acid) were then introduced at 28° C. and the reaction continued until completed. The p-aminobenzoyl chloride hydrochloride which formed separated into long needles and was isolated by adding some methylene chloride, filtered, washed free of methylene chloride and dried in a stream of dry nitrogen. Yield was 80% of theory.

Example 4 — Effect of Excess HCl 34.5 Parts of p-aminobenzoic acid hydrochloride (0.2 mole) were suspended in 100 parts tetramethylene sulfone and saturated with hydrogen chloride gas at 30° C. which took 10 parts (equivalent to 0.27 mole). To this mixture were then added 71 parts (0.597 mole) of thionyl chloride and the reaction carried out at 30° C. until completed. The reaction was very slow at 30° C. and the temperature had to be raised to 35° C. After 6 hours the reaction was finished and the product was isolated by adding methylene chloride and filtering at 15° C.

Another reaction was carried out as above, except that no additional hydrogen chloride was added. The reaction was over in 3 ¾ hours at 30° C., giving a 95% yield of p-aminobenzoyl chloride hydrochloride.

Example 5 — Hexamethylphosphoramide Solvent

40 Parts (0.29 mole) of p-aminobenzoic acid was dissolved in 200 parts hexamethylphosphoramide at 80° C. and 32 parts (0.88 mole) of HCl gas added. The p-aminobenzoic acid hydrochloride gave a viscous solution at 25° C. To this solution was then added at 25° C., 120 parts (1.01 mole) of thionyl chloride and the reaction mixture held for 1 hour at 25° C. No visible change had taken place but an IR-analysis of the solution indicated disappearance of the absorption band at 5.85 microns, indicative of the —COOH group, and appearance of strong absorption bands at 5.60 microns and 5.73 microns which are characteristic of the p-aminobenozyl chloride hydrochloride.

Hexamethylphosphoramide is a very good solvent for p-aminobenzoyl chloride hydrochloride so that no crystalline product could be obtained on addition of solvent like "Freon 113 solvent" or methyl chloride.

Example 6 — Diethylene Glycol Dimethyl Ether

80 Parts (0.58 mole) of p-aminobenzoic acid were dissolved in 240 parts of diethylene glycol dimethyl ether and 26 parts (0.71 mole) of HCl gas bubbled into the solution. A thick slurry of finely divided p-aminobenzoic acid hydrochloride formed. At 25° C., 200 parts (1.68 mole) of thionyl chloride were added with some cooling to hold the temperature at 25°–28° C. After one hour, the reaction mixture was warmed to 35°–40 C. After 45 min. at 35°–40° C., the thin reaction slurry suddenly thickened with a rapid formation of the aminobenzoyl chloride hydrochloride, which was confirmed by the IR spectrum of the solid which was filtered off and washed with methylene chloride.

Example 7 — Ethylene Glycol Dimethyl Ether

Into 340 parts of ethylene glycol dimethyl ether were dissolved 80 parts (0.58 mole) of p-aminobenzoic acid, and 26 parts (0.7 mole) of anhydrous HCl were added. To the thick slurry of HCl salt of p-aminobenzoic acid were added 200 parts (1.68 mole) of thionyl chloride and the reaction maintained for 2 hours at 40° C. without any indication that the acid chloride was forming. The temperature was then raised for a few minutes to 50° C. when the reaction started and continued after cooling to 25° C. After 2 ½ hours at 25° C. the reaction was essentially completed as indicated by the IR spectrum of the thick crystalline mass which had formed.

Example 8 — Tetraethylene Glycol Dimethyl Ether

80 Parts (0.58 mole) of p-aminobenzoic acid were dissolved at 30° C. in 240 parts of tetraethylene glycol dimethyl ether and 26 parts (0.71 mole) of anhydrous HCl passed into the solution. The hydrochloride of aminobenzoic acid precipitated. To this slurry was then added 200 parts (1.68 moles) of thionyl chloride at 25°–28 C. After one-half hour at 25° C. a clear solution was obtained and an IR spectrum showed no absorption at 5.85 microns indicating that the reaction was completed. There were strong absorption bands at 5.6 and 5.72 microns, the characteristic bands for the COCl group.

Example 9

250 Parts (1.82 moles) of p-aminobenzoic acid were dissolved at 80°C. in 710 parts of tetramethylene sulfone and 80 parts (2.19 moles) of HCl gas were introduced at 70°–75° C. To the thick slurry of the hydrochloride were added, at 28° C., 770 parts (6.4 moles) of thionyl chloride (3.5 moles per mole of amino acid). The reaction was continued at 31° C. for about 6 ½ hours until the IR spectrum indicated that the reaction was complete. The reaction mixture was diluted with 1,500 parts methylene chloride, cooled to 5° C., filtered and washed with methylene chloride until free of excess tetramethylene sulfone. At 28° C., the above reaction takes 8 hours to come to completion. The yield of p-aminobenzoyl chloride hydrochloride was 336 parts (1.75 moles), equal to 96% of theory.

Example 10 — p-Aminobenzoyl Chloride Sulfate

250 Parts of p-aminobenzoic acid (1.82 moles) were dissolved in 750 parts of tetramethylene sulfone at 70° C. Then a mixture of 200 g. tetramethylene sulfone and 104 g. of 96% sulfuric acid (1.02 moles) was added over the period of 1 ½ hours. The p-aminobenzoic acid sulfate precipitated immediately forming a thick white slurry.

After cooling to 28° C., 770 g. (6.5 moles) thionylchloride was added and the reaction mixture held at 28°–30 C. The progress of the reaction was observed by checking the IR absorption of the reaction mixture. The reaction was finished in 2 ½ hours, held another 2 hours and then diluted with methylene chloride and cooled to 5° C., filtered, washed with methylene chloride and dried in a stream of dry nitrogen.

The yield of dry product was 130 parts. Under the microscope long thin needles could be seen.

| Analysis: | Found* | Calc. for the sulfate Derivative |
|---|---|---|
| % Cl | 31.9 | 17.15 |
| % S | 2.9 | 7.82 |

* The variation was due to the fact that some of the sulfate groups on the amino nitrogen were replaced with hydrochloride groups.

Example 11 — p-Aminobenzoylchloride-p-Toluene Sulfonate

250 Parts of p-aminobenzoic acid (1.82 moles) were dissolved in 1,750 parts of tetramethylene sulfone at 80° C. and then a solution of 344 g. of anhydrous p-toluene sulfonic acid (2.0 moles) in 344 g. of tetramethylene sulfone were added over a period of 2 hours. The p-aminobenzoic acid-p-toluene sulfonate precipitated immediately and formed a thick slurry. After cooling to 28° C., 770 g. of thionylchloride (6.5 moles) were added at 28°–30° C. After 15 minutes the reaction mixture thickened and 30 minutes after the thionylchloride addition, the reaction was completed as indicated by the IR spectrum. The reaction mixture was diluted with 500 ml. of methylene dichloride, cooled to 5° C., filtered, washed with methylene dichloride, and dried in a stream of dry nitrogen.

Under the microscope the product appeared amorphous but observation with polarized light showed it to be distinctly crystalline with a particle size of 10–20 microns.

Yield of dry product was 381 parts.

Elemental analysis of the product checked well with values calculated for the p-aminobenzoylchloride-p-toluene sulfonate: $C_{14}H_{14}NO_4Cl\ S$

|  | Found | Calc. |
|---|---|---|
| % Cl | 11.0, 11.3 | 10.80 |
| % S | 10.1, 10.3 | 9.78 |

Example 12 — p-Aminobenzoylchloride-Hydrobromide

250 Parts of p-aminobenzoic acid were dissolved at 70°–80 C. in 750 parts of tetramethylene sulfone and 162 g. (2 moles) of anhydrous HBr added over a period of 2 hours. The p-aminobenzoic acid hydrobromide precipitated immediately forming a thick slurry.

After cooling to 30° C., 770 g. of thionylchloride was added and the reaction mixture held at 30° ± 1° C. and the progress of the reaction followed by IR analysis.

After 8 hours the reaction was finished. The reaction mixture was diluted with methylene chloride and the p-aminobenzoylchloride hydrobromide filtered at 5° C. and dried in a stream of dry nitrogen.

The IR analysis confirmed the presence of the expected acid chloride hydrobromide salt.

Example 13 — Continuous Process

The reactor consisted of coil glass tubing (20 ft., ⅜ in. I.D.) submerged in an oil bath maintained at 60° C. A stream of thionyl chloride preheated to 50° C. was fed into the reactor at a rate of 20 ml./min. (6 moles thionyl chloride/mole of p-aminobenzoic acid HCl) simultaneously with a 50° C. preheated stream of p-aminobenzoic acid hydrochloride slurried in tetramethylene sulfone at 40 ml./min. The slurry was prepared by dissolving 1,240 parts (9.04 moles) of p-aminobenzoic acid in 10,400 parts of tetramethylene sulfone and adding 392 parts (10.74 moles) of hydrogen chloride at 60° C. The exit stream was fed into a glass vessel for 90 minutes. After the first 4 minutes, agitation was begun and methylene chloride was added at the rate of 50 ml./min. Pot temperature was maintained at 0°–5° C. The product slurry was removed, the product filtered, washed 6 times with 500 ml. portions of methylene chloride and dried under a nitrogen atmosphere. 375 Parts of p-aminobenzoyl chloride hydrochloride, corresponding to an overall yield of 75%, were obtained.

The foregoing detailed description has been given for clearness of understanding only and no unnecessary limitations are to be understood therefrom. The invention is not limited to the exact details shown and described, as obvious modifications will occur to those skilled in the art.

What is claimed is:

1. Process for the preparation of a p-aminobenzoyl chloride salt which comprises reacting a p-aminobenzoic mineral acid salt with at least 1.2 moles of thionyl chloride per mole of said mineral acid salt in an inert organic solvent selected from the group consisting of tetramethylene sulfone, hexamethylphosphoramide, ethylene glycol dimethyl ether, diethylene glycol dimethyl ether and tetraethylene glycol dimethyl ether, at a temperature of from about 20° – 120° C., and recovering the product.

2. Claim 1 where said temperature is 20°–40° C.

3. Claim 1 wherein there is additionally added to the reaction mass a diluent selected from the group consisting of methylene chloride, chloroform, benzene and carbon tetrachloride.

4. Claim 1 wherein 3 to 20 moles of thionyl chloride are present per mole of p-aminobenzoic acid hydrochloride.

5. Claim 1 wherein the solvent is tetramethylene sulfone.

6. Claim 1 wherein said mineral acid salt is p-aminobenzoic acid hydrochloride.

7. Claim 1 wherein the p-aminobenzoic mineral acid salt reactant preparation comprises dissolving p-aminobenzoic acid in the organic solvent and adding at least one molar equivalent, per mole of p-aminobenzoic acid, of the corresponding anhydrous acid; and wherein the reaction with thionyl chloride is then performed in situ.

8. Claim 1 wherein 1–5 moles, per mole of p-aminobenzoic acid, of anhydrous hydrogen chloride is employed.

9. Claim 1 wherein streams of said thionyl chloride and of said p-aminobenzoic acid salt slurried with said solvent are simultaneously fed through a reactor at a temperature of about 50°–120° C.

10. Claim 1 wherein the acid salt is p-aminobenzoic acid hydrochloride.

11. Claim 1 wherein said temperature is 55°–65° C.

* * * * *